(12) United States Patent
Asmacher et al.

(10) Patent No.: US 12,410,320 B2
(45) Date of Patent: Sep. 9, 2025

(54) DUAL CURE CYANATE ESTER INKJET COMPOSITION

(71) Applicant: ALTANA NEW TECHNOLOGIES GMBH, Wesel (DE)

(72) Inventors: Anne Asmacher, Hannover (DE); Rolf Mühlhaupt, Freiburg (DE); Filipp Petrov, Lehrte (DE); Jürgen Omeis, Reken (DE); Frank Walter, Rüsselsheim (DE); Max Röttger, Hannover (DE)

(73) Assignee: Altana New Technologies, GmbH, Wesel (DE)

( * ) Notice: Subject to any disclaimer, the term of this patent is extended or adjusted under 35 U.S.C. 154(b) by 0 days.

(21) Appl. No.: 18/032,231

(22) PCT Filed: May 10, 2022

(86) PCT No.: PCT/EP2022/062672
§ 371 (c)(1),
(2) Date: Apr. 17, 2023

(87) PCT Pub. No.: WO2022/258284
PCT Pub. Date: Dec. 15, 2022

(65) Prior Publication Data
US 2023/0399519 A1     Dec. 14, 2023

(30) Foreign Application Priority Data
Jun. 9, 2021 (EP) .................................. 21178542

(51) Int. Cl.
| | | |
|---|---|---|
| C09D 4/00 | (2006.01) |
| B29C 64/112 | (2017.01) |
| B29C 64/30 | (2017.01) |
| B29C 71/02 | (2006.01) |
| B33Y 10/00 | (2015.01) |
| B33Y 40/20 | (2020.01) |
| B33Y 70/00 | (2020.01) |
| C08G 18/67 | (2006.01) |
| C08G 18/76 | (2006.01) |
| C09D 7/63 | (2018.01) |
| C09D 175/14 | (2006.01) |
| B29K 23/00 | (2006.01) |
| B29K 75/00 | (2006.01) |

(52) U.S. Cl.
CPC .............. *C09D 4/00* (2013.01); *B29C 64/112* (2017.08); *B29C 64/30* (2017.08); *B29C 71/02* (2013.01); *B33Y 10/00* (2014.12); *B33Y 40/20* (2020.01); *B33Y 70/00* (2014.12); *C08G 18/6755* (2013.01); *C08G 18/676* (2013.01); *C08G 18/678* (2013.01); *C08G 18/7671* (2013.01); *C09D 7/63* (2018.01); *C09D 175/14* (2013.01); *B29K 2023/38* (2013.01); *B29K 2075/02* (2013.01); *B29K 2995/0077* (2013.01); *B29K 2995/0082* (2013.01)

(58) Field of Classification Search
CPC . C09D 4/00; C09D 7/63; B33Y 10/00; B33Y 70/00; B33Y 40/20; B29C 64/112; B29C 64/30; B29C 71/02; C08G 18/6755; C08G 18/676; C08G 18/678
See application file for complete search history.

(56) References Cited

U.S. PATENT DOCUMENTS

| | | |
|---|---|---|
| 9,453,142 B2 | 9/2016 | Rolland |
| 10,005,911 B2 | 6/2018 | Shimura |
| 2009/0105363 A1 | 4/2009 | Napadensky |
| 2015/0064417 A1 | 3/2015 | Choi |
| 2016/0369040 A1 | 12/2016 | Das et al. |
| 2017/0173866 A1 | 6/2017 | Schonenberg |
| 2019/0010343 A1 | 1/2019 | Menyo et al. |
| 2022/0145019 A1 | 5/2022 | Grover et al. |

FOREIGN PATENT DOCUMENTS

| | | |
|---|---|---|
| CN | 110128773 | 8/2019 |
| EP | 3862167 | 8/2021 |
| KR | 20190109617 | 9/2019 |
| WO | 2004096514 | 11/2004 |
| WO | 2017040883 | 3/2017 |
| WO | 2019112707 | 6/2019 |
| WO | 2019129464 | 7/2019 |
| WO | 2019203134 | 10/2019 |
| WO | 2020065654 | 4/2020 |
| WO | 2020109769 | 6/2020 |
| WO | 2020211656 | 10/2020 |

OTHER PUBLICATIONS

International Search Report and Written Opinion for International Application No. PCT/EP2022/062672 mailed Sep. 12, 2022.
S. Velankar et al., "High Performance UV-Curable Urethane Acrylates via Deblocking Chemistry," Journal of Applied Polymer Science, vol. 62, 1361-1376 (1996).
Rahn, Genorad 22 Safety Data Sheet, Nov. 27, 2020, pp. 1-10.

*Primary Examiner* — Mathieu D Vargot

(57) ABSTRACT

The present invention relates to an inkjet composition having 1.0-5.0 mol/kg acryloyl groups comprising:
    i) photo polymerization reactive compound (M) containing exactly one acryloyl group,
    ii) photo polymerization reactive compound (N) containing at least two acryloyl groups,
    iii) radical photoinitiator (R),
    iv) cyanate ester compound (D) containing at least two cyanate groups and
    v) cyanate ester curing catalyst (C), wherein
(M) is different from (D) and (N) is different from (D), 25-50 mol % of the contained acryloyl groups are provided by the reactive compound (N) and the molar ratio of contained acryloyl groups to contained cyanate groups of compound (D) is 0.30 to 0.95.

26 Claims, No Drawings

DUAL CURE CYANATE ESTER INKJET COMPOSITION

The present invention relates to an inkjet composition, its use, a process for printing a three-dimensional object and the three-dimensional object.

Three dimensional (3D) printing or additive manufacturing is a process in which a 3D digital model is manufactured by the accretion of construction material. The 3D printed object is created by utilizing the computer-aided design (CAD) data of an object through sequential construction of two dimensional (2D) layers that correspond to cross-sections of 3D objects. These layers were printed over one another with the proviso that each layer is rapidly cured (e.g. by UV curing) before the next layer is printed accordingly.

One way to perform said 3D printing is inkjet printing: In inkjet printing, tiny drops of ink (having a limited viscosity) are projected directly onto a receiver surface without physical contact between the printing device and the ink-receiver. The printing device stores the printing data electronically and controls a mechanism for ejecting the drops image-wise. Printing is accomplished by moving a print head across the ink-receiver or vice versa or both.

Three-dimensional inkjet printing is a relatively speedy and flexible printing method for the production of prototype parts, tooling and rapid manufacturing of three-dimensional complex structures directly from a CAD file. Radiation curable compositions for use in three-dimensional printing methods of complex structures are e.g., described in WO 2004/096514. However, there are generally many radiation curable compositions described in the art which might be used in the field of inkjet printing, like in US 2017/173866, WO 2019/203134, WO 2020/065654 and WO 2020/211656.

Challenges encountered with said 3D printing are poor mechanical properties such as low heat deflection temperature, brittleness and ageing meaning the embrittlement over time and/or under temperature change and/or humidity. Another challenge is the incomplete curing of the (initially) printed 3D object (so called "green body") and also several quality problems (e.g. mechanical aspects and/or product ageing) concerning the final product. If the 3D object is cured completely during the 3D printing process, the interlayer adhesion is too weak and the print may fail.

However, uncured resin inside the final product is also undesirable: First, uncured liquid resin leaking ("bleeding") from the printed 3D objects may cause health problems to end users because the liquid resin may contain reactive chemicals. Second, the printed 3D objects do not reach optimal mechanical performance because the uncured liquid resin may soften the object. Third, the uncured resin may cause problems in some industrial applications of the objects where high chemical inertia is required. In order to fully cure the printed "green body" objects (to avoid the said disadvantages), a corresponding post-curing of the 3D "green body" is necessary.

Thus, an appropriate inkjet printing ink has to combine (to fulfill) at the same time the following conditions: having a sufficient low viscosity (enables the printing of tiny drops through an inkjet nozzle), providing a high viscosity stability (e.g. should not polymerize in the printing apparatus prior the printing), being sufficiently pre-curable (each printed ink layer has to be pre-cured before the next layer is printed) and being efficiently post curable (fully curable in a subsequent step in order to provide the 3D object with the required quality properties).

Thus, it is an object to the present invention to provide an inject printing ink of high quality which fulfills the requirements described above.

The solution to this object is an inkjet composition having 1.0-5.0 mol/kg acryloyl groups comprising:
 i) photo polymerization reactive compound (M) containing exactly one acryloyl group,
 ii) photo polymerization reactive compound (N) containing at least two acryloyl groups,
 iii) radical photoinitiator (R),
 iv) cyanate ester compound (D) containing at least two cyanate groups and
 v) cyanate ester curing catalyst (C), wherein
 (M) is different from (D) with the proviso that cyanate ester compound containing exactly one acryloyl group and additionally containing at least two cyanate groups should be subsumed to (D), and (N) is different from (D) with the proviso that cyanate ester compound containing at least two acryloyl groups and additionally containing at least two cyanate groups should be subsumed to (D), 25-50 mol % of the contained acryloyl groups are provided by the reactive compound (N) and the molar ratio of contained acryloyl groups to contained cyanate groups of compound (D) is 0.30 to 0.95.

The cyanate ester compound (D) (is of the type R(—OCN)$_x$) contains at least two cyanate groups (—OCN).

Acryloyl groups according to the present invention are defined as to be $H_2C=CH—C(=O)—$ (which might be a part of an "acryl ester group" of the type $H_2C=CH—C(=O)—O—$). These groups are very reactive and efficient free radical polymerization groups (and much more reactive like e.g. meth acryl groups).

Photo polymerization reactive compound (M) "containing exactly one acryloyl group" means that not more and not less than one acryloyl group is contained.

(M) is different from (D) means that photo polymerization reactive compound (relevant species) containing exactly one acryloyl group and additionally containing at least two cyanate groups should be subsumed to (D) (and not to (M)). However, the use of such "hybrid"-components is not preferred (might be avoided).

Accordingly, (N) is different from (D) means that that photo polymerization reactive compound (relevant species) containing at least two acryloyl groups and additionally containing at least two cyanate groups should be subsumed to (D) (and not to (N)). However, the use of such "hybrid"-components is not preferred (might be avoided).

According to the present invention, the inkjet composition comprises with (M) and (N) photocurable compound (based on "photo initiation") and with (D) also thermocurable compound.

The photocurable compound is able to polymerize and/or to crosslink in a first step by free radical (photo) polymerization and the thermocurable compound reacts in a subsequent thermal post curing step (via a polyaddition).

The inkjet composition according to the present invention fulfills the relevant quality requirements:

The composition provides the basis for a sufficient low viscosity which enables the generation of tiny (ink jettable) ink drops. Additionally, the composition provides the basis concerning a sufficient viscosity stability which is a basic requirement to maintain a working printing process (e.g. gelling of the ink would block and even destroy the printer).

Furthermore, the inkjet composition according to the present invention allows the generation of a pre-product with sufficient mechanical properties, especially of a pre-product with a sufficient "green body strength": The green body strength describes the stability of the object after photo-curing and before thermo-curing. The green body strength is a measure on the stability and crosslinking of the photo-cured object. However, it is not desired to provide a green body strength which is too high: During post-processing (thermal curing) the UV-system guarantees the shape consistency, meaning it holds the thermal system in place before and during its curing/immobilization. However, once the thermal system starts to cure and depending on its properties, internal strain might be generated (especially if crosslinking in the first photo polymerisation step was too intensive) which can destroy the UV-cured structure (cracks). The inherent and technology typical roughness of the relevant surfaces leads to even easier crack formation due to internal strain generation. The use of an inkjet composition according to the present invention provides a kind of "compromise" that does take all of these relevant different issues into consideration—especially: crosslinking has to be rigid enough to provide green body strength and keep the thermal curing system in place on the one hand but must not be too brittle in order to survive thermal curing on the other hand.

The special "crosslinking strategy" that justifies the advantages according to the present invention is reflected in the underlying "laws" of the inkjet composition, which is decisively justified by compliance with the following (key) parameters I), II) and III):

I) inkjet composition having 1.0-5.0 mol/kg acryloyl groups;
II) 25-50 mol % of the contained acryloyl groups are provided by the reactive compound (N);
III) molar ratio of contained acryloyl groups to contained cyanate groups of compound (D) is 0.3 to 0.95.

(Key) Parameter I):

If the value is too high, a stronger tension is generated in the green body—later crack formation is favored—if the value is too low, the green body strength suffers: ultimately, among other things, a suitable compromise between providing strength, toughness and elasticity.

(Key) Parameter II):

This parameter also provides a practical compromise solution between (green body) strength and elasticity. Too high a concentration of poly acrylates also causes a considerable increase in ink viscosity, so that printability by inkjet is made more difficult. On the other hand, the poly acrylates in particular are decisive for the formation of the network and thus for sufficient green body strength.

The mono acrylates contribute in particular to the toughness-compatibility balance of the matrix network of the IPN with regard to tension compensation during thermal post-curing and to the control of hard and soft phases as well as phase domains.

The right balance of green body strength and flexibility is ensured by adhering to parameter II): Too low a value causes insufficient green strength, whereby too high a value on the one hand usually causes viscosity problems, but in particular causes a disadvantageous distortion (distortion: serves the macroscopic/optical characterization of the curvature/bending of cast test specimens):

The distortion ("as a bend in "test specimens"—compared to a smooth surface") increases with increasing degree of crosslinking. In the injection process, such a distortion can occur practically per layer, which favors a later crack formation between the layers.

Curvature due to distortion might be also problematic because the next inkjet layer of ink drops should always be applied to a smooth surface (height control, dynamic effects).

(Key) Parameter III):

In the broadest sense, this parameter ensures a balanced ratio of stabilization by means of pre-hardening and post-curing—concerns, among other things, compromise between green body strength and strength of the final body.

With increasing degree of curing of the first network (pre-curing), stronger stress is generated in the green body during the formation of the second, thermal network (post-curing), which favors the formation of cracks (would be disadvantageously associated with too high a value). However, sufficient green body strength is essential (a value that is too low would ultimately be disadvantageous in this respect).

Parameter III) as a relative ratio is always to be seen in combination with parameter I), which ultimately determines the networking density of both networks.

A further provided effect concerning the use of an inkjet composition according to the present invention is that "bleeding" of the printed objects before and during thermal cure is avoided (especially during the removal of the support structure with an aqueous liquid and during the thermal curing): Liquid material leaking from the printed 3D objects may cause health problems to end users because the liquid resin may contain reactive chemicals.

According to a special embodiment to the invention the inkjet composition might be provided as a kit: corresponding kit-in-parts inkjet composition may comprise a combination of at least one photocurable compound and at least one thermocurable compound and a separate photoinitiator. The kit-in-parts inkjet composition might comprise a combination of at least one photocurable compound, at least one thermocurable compound and a photoinitiator and a separate curing catalyst. However, in most cases it is not necessary and not advantageous to provide such a kit (a kit might be avoided).

According to a preferred embodiment the inkjet composition according to the present invention has 1.7-3.5 mol/kg acryloyl groups. Typically, in the inkjet composition 30-45 mol % of the contained acryloyl groups are provided by the reactive compound (N). The appropriate (quantitative) combination of the said two features "contained mol/kg acryloyl groups" and "mol % of the contained acryloyl groups provided by the reactive compound (N)" is also important concerning the provision of a pre-product (and also of the final product) which is not too brittle (tendency to crack) on the one hand but also not too soft on the other hand.

According to a preferred embodiment in the inkjet composition 80-100 mol %, preferably 90-100 mol %, of the reactive compound (N) are provided by species containing not more than three acryloyl groups. However, it is important to regard this regularity in combination with the said other features "contained mol/kg acryloyl groups" and "mol % of the contained acryloyl groups provided by the reactive compound (N)" because the (right quantitative) combination of these features has been identified as to be a basic requirement concerning the provision of a working process on the one hand and the generation of a product of high quality on the other hand.

Mono acrylates (especially compound (M)) often contribute regarding a moderate viscosity of the inkjet composition (especially species having a moderate molecular weight). A higher amount of mono acrylates reduces the degree of crosslinking.

The following mono acrylates might be used: Ethylacrylate, stearyl acrylate, tetrahydrofurfuryl acrylate, lauryl acrylate, 2-phenoxyethyl acrylate, isodecyl acrylate, isooctyl acrylate, tridecyl acrylate, caparolactone acrylate, ethoxylated nonyl phenol acrylate, isobornyl acrylate, hexadecyl acrylate, monomethoxy tripropylene glycol monoacrylate, monomethoxy neopentyl glycol propoxylate monoacrylate, B-carboxyethyl acrylate, and/or oxyethylated phenol acrylate.

According to a preferred embodiment the mono acrylate might be selected from dihydrodipentadienyl acrylate (CAS: 12542-30-2), cyclic trimethylolpropane formal acrylate (CAS: 66492-51-1), tricyclodecanemethanol acrylate (CAS: 93962-84-6), 2-phenylethyl acrylate (CAS: 3530-36-7), 2-hydroxy-3-phenoxypropylacrylat (CAS: 16969-10-1), 2-[(butylcarbamoyl)oxy]ethyl acrylate (63225-53-6) and/or 4-hydroxybutyl acrylate (2478-10-6).

However, the most preferred mono acrylate species are isobornyl acrylate, acryloyl morpholine, 2-[(butylcarbamoyl)oxy]ethyl acrylate or mixtures thereof.

The following di acrylates might be used: 1,3 butylene glycol diacrylate, 1,4 butanediol diacrylate, diethylene glycol diacrylate, 1,6 hexanediol diacrylate, neopentyl glycol diacrylate, polyethylene glycol diacrylate, tetraethylene glycol diacrylate, triethylene glycol diacrylate, dipropylene glycol diacrylate, tripropylene glycol diacrylate, polyethylene glycol diacrylate, ethoxylated bisphenol A diacrylate, propoxylated neopentyl glycol diacrylate, ethoxylated neopentyl glycol diacrylate, ethoxylated tripopylene glycol diacrylate and/or monomethoxy trimethylolpropane ethoxylate diacrylate.

The following tri acrylates might be used: trimethylol propane triacrylate, tris(2-hydroxy ethyl) isocyanurate triacrylate, ethoxylated trimethylol propane triacrylate, propoxylated glycerol triacrylate ditrimethylol propane triacrylate, pentaerythritol triacrylate, and/or propoxylated trimethylolpropane triacrylate.

However, preferred poly acrylates (especially as the photo polymerization reactive compound (N) containing at least two acryloyl groups) are trimethylolpropantriacrylat, tricyclodecane dimethanol diacrylate (CAS: 42594-17-2), polyethylene glycol diacrylate (CAS: 25322-68-3), polypropylene glycol diacrylate (CAS: 52496-08-9), poly(propylene glycol) dimethacrylate (CAS: 25852-47-5), dipropylene glycol diacrylate (CAS: 57472-68-1), trimethylolpropane trimethacrylate (3290-92-4), bisphenol A glycerolate diacrylate (CAS: 4687-94-9), tris isocyanurate triacrylate (CAS: 40220-08-4), bisphenol A epoxy diacrylate (CAS: 55818-57-0) and/or trimethylolpropane tetraacrylate (CAS: 94108-97-1).

The photocurable compound(s) are comprised in the inkjet composition in mol amounts as specified above—that might be amounts of e.g. 20 to 50 wt. %, based on the total weight of the inkjet composition.

The photo polymerization reactive compound (species of (M) and (N)) and the radical photo initiator (R) may be comprised in the inkjet composition in a weight ratio of 95:5 to 99.5:0.5, preferably 97:3 to 99:1.

The photo initiator (R) generates reactive species (free radicals) when exposed to radiation (e.g. UV or visible light).

The photo initiator might be comprised in the inkjet composition in an amount of to 4 wt. %, based on the total weight of the inkjet composition.

According to one embodiment species of the radical photoinitiator (R) are provided by phosphinoxide-based photoinitiators, preferably by diphenyl(2,4,6-trimethylbenzoyl)phosphine oxide and/or phenyl bis(2,4,6-trimethylbenzoyl)phosphine oxide.

The contained thermocurable compound is a compound which is able to addition polymerize (poly addition) and/or crosslink when exposed to heat. Preferably, the thermal curable compound should not polymerize and/or cross-link at temperatures below 100° C. According to the present invention the cyanate ester compound (D) containing at least two cyanate groups is provided as thermocurable compound.

Regarding the achieved quality (especially mechanical properties) it is important that there is an appropriate ratio in the inject composition regarding photo reactive groups (pre hardening according to the first step) on the one hand and thermal reactive groups (post hardening active) on the other hand. In this connection it is preferred that in the inkjet composition the molar ratio of contained acryloyl groups to contained cyanate groups of compound (D) is 0.36 to 0.94.

Cyanate ester compound (D) containing at least two cyanate groups is well known by a skilled person. Relevant species are known as poly cyanate esters which are preferably aromatic or aliphatic diisocyanate esters, especially aromatic diisocyanate esters.

Relevant species may comprise a bisphenol E based cyanate ester (AroCy® L-10), a novolac-based cyanate ester (AroCy® XU 371), a bisphenol M based cyanate ester (AroCy® XU 366 and AroCy® XU 378). The cyanate ester may preferably be a bisphenol E based cyanate ester (AroCy® L-10) or a novolac-based cyanate ester (AroCy® XU 371).

The cyanate ester compound (D) containing at least two cyanate groups is comprised in the inkjet composition in an amount as defined above (indirectly defined: by means of the molar ratio of contained acryloyl groups to contained cyanate groups of compound (D)) which might be e.g. 35 to 75 wt. %, based on the total weight of the inkjet composition.

According to a special embodiment at least 30 wt.-% of the species of (D), preferably at least 60 wt.-% of the species of (D), are provided by 4,4'-ethylidenediphenyl dicyanate (e.g. provided by "AroCy® L-10").

The used curing catalyst should be chosen wisely to start thermal reaction at a certain temperature which is much higher than the temperature during printing.

This temperature should be not too high as the UV-system might not survive temperature above 220° C. for long time. In the same time, they must be as low reactive as possible at printing conditions. They should work in a way that they can drive the thermal reaction to highest conversion. They should not destabilize the UV-system and they should survive a possible washing procedure to remove used support structures (as described below). If the relevant manufacturing procedure should work well and a good product quality should be achieved it might be advantageous that species of the cyanate ester curing catalyst (C) are provided by an aluminium metal catalyst, preferably by aluminium acetylacetonate.

However, the cyanate ester curing catalyst (C) might be generally a chelated metal catalyst, preferably based on a chelated aluminum catalyst.

The metal catalyst may be comprised in the inkjet composition in an amount of 100 to 3000 ppm, preferably 300 to 2000 ppm, based on the total weight of the cyanate ester compound (D) containing at least two cyanate groups in the inkjet composition.

According to a preferred embodiment 90-100 wt. preferably 97-100 wt. of the contained ingredients (in the inkjet composition) are provided by species of (M), (N), (R), (D) and (C).

The addition of other ingredients is possible but in many cases not advantageous (e.g. if there is no contribution concerning a curing effect or if non-desired thermal reactivity below 100° C. is caused): Generally, it is not preferred to use (higher amounts of) inert solvents (not able to photopolymerize in the first step or to post cure in the second step). Preferably, the inkjet composition contains less than 8 wt. %, more preferably less than 2 wt. %, inert solvents. Furthermore, it is not preferred to use (higher amounts of) radical polymerizable monomers not containing acryloyl groups (like meth acrylates). Preferably, the inkjet composition contains less than 6 wt. %, more preferably less than 2 wt. %, radical polymerizable monomers not containing acryloyl groups. For example, meth acrylates are e.g. not reactive enough regarding the (short) radical photo polymerization. Preferably, the inkjet composition contains less than 6 wt. %, more preferably less than 2 wt. %, meth acrylates (not containing acryloyl groups).

In order to avoid non-desired side reactions (typically increasing viscosity), it is preferred that the inkjet composition does not contain cationic or anionic (photo)polymerization initiator. In any case it is preferred to avoid compounds (especially high amounts of them) which at temperatures below 100° C. react in the composition via one of the step reaction types: polyaddition, polycondensation. Such compounds (especially in higher amounts) might cause problems regarding the desired viscosity stability. It is essential to limit the viscosity of the inkjet composition in order to enable its jetting through a thin nozzle.

Typically, the inkjet composition has a viscosity of 10-40 mPa·s at 45° C., where the viscosity is measured on a thermally controlled rotational rheometer in cone-plate geometry (Anton Paar Physica MCR 300, cone diameter: 60 mm, zero-gap distance: 0,061 mm, cone angle: 0,5°, shear-rate 600s−1).

However, the inkjet composition according to the present invention additionally might contain stabilizers, wetting agents, defoamers, radical polymerization inhibitor and/or pigments. Normally, dissolved oxygen works as radical polymerization inhibitor but additionally synthetic inhibitors might be used.

The present invention also relates to a process for printing a three dimensional object comprising the steps of:
(a) jetting the inkjet composition as described above by means of a printing machine to form a layer in a configured pattern corresponding to the shape of the object,
(b) irradiating the formed layer to form a photo-cured layer,
(c) sequentially repeating steps (a) and (b) to form a plurality of photo-cured layers in order to prepare a green body of the three dimensional object and
(d) heating said green body to post cure the three-dimensional object.

Normally, additionally a support ink is printed and cured in order to stabilize the green body, where the cured support ink is water soluble and is removed after step c) and before the performance of step (d) by treating with an aqueous washing liquid.

Typically, step (d) is performed in such a way that temperatures between 110 and 140° C. are kept at least for 5 hours.

Normally, in the heating step (d) the relevant increase of the temperature is limited to 2 K/min.

Preferably, in step (b) the irradiation is performed by means of an UV lamp and the exposure time of each ink layer is 0.1-2 s.

A typical procedure might be as follows:

The inkjet composition may be filtered before using it as an inkjet composition. Preferably, the inkjet composition is filtered in a manner so that it does not comprise particles having a particle size of more than 1 µm. Then, the ink is loaded into the printer. The system recirculates for at least 2 hours, better more to assure homogeneity and constant temperature. During printing, the support ink (e.g. acryl amide based) is ink-jetted and UV-cured creating a mold for the object ink which is ink-jetted and UV-cured afterwards (wet on dry printing). To control layer thickness all inks are levelled in their liquid state once on the building tray which takes place after ink-jetting during the dynamic wetting process on the substrate and before UV-curing. In this manner the 3D-object is generated. The support ink is printed layer per layer (together with the layers of the green body) so that after the printing process the object (green body) is surrounded by support material (e.g. poly acryl amid). To remove the support material, the entire structure is placed in a water bath and heated to 35-40° C. in the presence of ultrasound. Depending on support material and geometry of the object, the washing process takes 0.5 h-24 h, sometimes even longer. Once all support structure is removed, the object is taken out of the water bath and dried at room temperature on air. After about 5 h drying, the object is placed in a heating chamber (kind of oven) where depending on the chemistry, geometry and application a well-adapted temperature program is chosen to heat-cure the thermal curing system present in the printed and now washed object. It is beneficial to slowly start the thermal reaction avoiding strong exothermic heat development and giving the UV-cured system time to relax. After the appropriate thermal curing it is of advantage to slowly cool down to avoid trapping of internal stresses.

The present invention also relates to a three-dimensional object manufactured according to the method as described above.

The three dimensional object may have a tensile strength of 21-40 MPa, preferably of 41-100 MPa and an elongation at break of 2.1-5%, preferably of more than 5% and an E-modulus of 100-1000 MPa, preferably of 1001-4500 MPa.

Additionally, the present invention is directed to the use of an inkjet composition as described above for manufacturing a three-dimensional object.

General Methods for Measuring

Viscosity is measured on a thermally controlled rotational rheometer in cone-plate geometry (Anton Paar Physica MCR 300, cone diameter: 60 mm, zero-gap distance: 0,061 mm, cone angle: 0,5°, shear-rate 600s−1) at temperatures from 40 to 60° C. with a heating ramp of 2 K/min following the DIN EN ISO 3219. For comparison, the viscosity at 50° C. or at 60° C. is shown in the following examples. Storage stability of inks was determined with the same experiment than described above after storing closed sample jars for 2, 5, 7 and/or 8 days at 60° C.

The Shore hardness A and D was measured following the DIN EN ISO norm 7619 by a OS-2 measuring device from Hildebrand Prüf- and Messtechnik GmbH with cylindrical specimens in diameter of 40 mm and thickness of 7 mm. The results were taken off the scale after 3 seconds of placing the needle on the specimen. The measurement was repeated 5 times.

The green body strength is measured by creating rectangular specimens with a dimension of 40 mm×7 mm×2 or 4 mm (b×a×c) of the respective formulation by UV-irradiation. This specimens were placed on two PTFE-blocks with a volume of 100 mm×5 mm×5 mm. The span width was 35 or 75 mm. The set-up was kept at room temperature and after 1,5 h the bending/deformation was checked. To quantify different formulations, a grading system was defined: A) means no (i.e. 0% bending) or almost no bending in the range of not more than 5%, not more than 3%, not more than 1% from the initial rectangular specimen was observed directly. The percentage in bending is defined in comparing the center position (e.g. dimension 20 mm×3.5 mm×2 mm (b×a×c)) of the rectangular specimen at the beginning of the set-up at time 0 and the center position of the rectangular specimen at the end of the set-up at time 1,5 h. B) means that the bending becomes more pronounced so that the specimen shows bending of more than 5% to 20%. C) means that the specimen shows bending of more than 20% to almost touching the ground. D) indicates that the specimen touches ground. The same was done after curing in the above-mentioned oven-cure program. Tensile testing was performed on a Zwick-Roell tensile tester 1445 following the DIN EN ISO norm 527-1 with 5A specimen. E-Modulus was determined from the slope of the stress-strain curve at deformations from 0.05-0.25% at 1 mm/min. Tensile strength and elongation at break were determined by pulling the specimen at 5 mm/min for rigid materials.

Three-point bending tests to measure flexural strength and modulus were carried out on a Zwick Roell 1445 following the DIN EN ISO norm 178 with specimens of the dimension of 80×10×4 mm and a bending transducer of 500 N. The test specimens were bent in the center at a span distance of 64 mm with a compression fin with radius of 5 mm at a crosshead speed for the bending modulus of 2 mm/min (in the range of 0.05-0.25% elongation) and subsequent test speed of 10 mm/min until failure.

The impact strength was measured using an IZOD set-up following DIN EN ISO norm 180 with unnotched specimens of dimensions of 80×10×4 mm and an impact pendulum of 2.75 J on a Zwick HIT5.5P Plus.

The heat deflection temperature B (0.45 MPa) or A (1.80 MPa) as a three-point-bending test was performed on a HDT-measuring device Compact 3 from Coesfeld on specimens with dimensions of 80×10×4 mm according to DIN EN ISO 75. The heat rate was set to 2 K/min in a range from 30° C. until reaching the HDT-value.

The glass transition temperature as well as the network density were determined using a thermomechanical analysis (TMA) three-point-bending set-up from Mettler Toledo (TMA/SDTA2+LN2) with specimen dimensions of 10×5×1.2 mm referring to DIN EN ISO 11359. The heat rate was 5 K/min in a range of 20-300° C. and the alternating load in sinus mode was set between 0.02 to 1.0 N. The network density was then calculated by the storage modulus 50 K above $T_g$ divided by 3 as an empirical factor, the gas constant R and the temperature 50 K above $T_g$ (in Kelvin).

The warpage of 5A-specimens from tensile testing after UV— and thermal curing in the above-mentioned oven-cure program was determined by checking the bending/deformation in a way that a grading system was defined: A) means no (i.e. 0% bending) or almost no bending in the range of not more than 5%, not more than 3%, not more than 1% from the initial specimen was observed. The percentage in bending is defined in comparing the center position of the specimen at the bottom plate to the outer jaws that might be lifted up from the bottom plate. B) means that the bending becomes more pronounced so that the specimen shows bending of more than 5% to 10%. C) means that the specimen shows bending between 10-20%. D) indicates that the specimens bending is more than 20%.

The present invention is further described below by using examples.

General Terms and Definitions

Reactants as Used in the Examples

Isobornylacrylate (IBOA)— CAS No 5888-33-5 from SARTOMER

Acryloyl morpholine (ACMO)— CAS No 5117-12-4 from RAHN

Trimethylolpropane triacrylate (TMPTA)— CAS No 15625-89-5 from SARTOMER

CN981— polyether ester urethane diacrylate—CAS No 72162-39-1 from SARTOMER

BHT—CAS No 128-37-0 from SIGMA ALDRICH

Omnirad 819— photoinitiator with CAS No 162881-26-7 from IGM Resins

Genorad 16— polymerisation inhibitor being a combination of glycerol propoxylate (1PO/OH) and 4-methoxyphenol from RAHN AroCy 10 L US— bisphenol-E based cyanate ester—CAS No 47073-92-7 from HUNTSMAN Al(acac)$_3$—CAS No 13963-57-0 from SIGMA ALDRICH Co(acac)$_3$—CAS No 21679-46-9 from SIGMA ALDRICH BYK 333— polyether modified polydimethylsiloxane additive from BYK Example 1

Isobornlyacrylate (IBOA) (25.0 wt %), acryloyl morpholine (ACMO) (12.5 wt %), trimethylpropane triacrylate (TMPTA) (12.5 wt %), butylhydroxytoluol (BHT) (0.3 wt %), Omnirad 819 (1.0 wt %), Genorad 16 (0.5 wt %), BYK 333 (0.2 wt %), AroCy 10 L US (48.2 wt %) (bisphenol-E based cyanate ester with two cyanate groups) and additional 500 ppm Al(acac)$_3$ were mixed and filtered over 1 μm.

| Example 1 Compound | Wt % in formulation | Mol of curing functionality (for 1 kg final formulation) | % of all UV-curing functionalities | % of all curing functionalities |
|---|---|---|---|---|
| IBOA | 25 | 1.20 | 36% | 17% |
| ACMO | 12.5 | 0.88 | 26% | 13% |
| TMPTA | 12.5 | 1.26 | 38% | 18% |
| AroCy 10 L | 48.2 | 3.64 | | 52% |

The ink was inkjet UV printed and post-cured from RT to 220° C. with a heating ramp of 1K/min.

The final properties of the final object were:

Tensile strength: 75 MPa

Elongation at break: 2.5%

E-Modulus: 3200 MPa

Green body measurement after UV-curing (40×7×4 mm) A

Green body measurement after thermal-curing (40×7×4 mm): A

The said inkjet composition comprises:

I) mol/kg acryloyl groups of (M) and (N): 3.35

II) mol % of acryloyl groups provided by reactive compound (N): 37.8

III) molar ratio of contained acryloyl groups (M) and (N) to contained cyanate ester groups of compound (D): 0.92

Example 2

Isobornlyacrylate (12.5 wt %), acryloyl morpholine (7.5%), trimethylolpropane triacrylate (7.5%), BHT (0.3 wt %), Omnirad 819 (1 wt %), Genorad 16 (0.5 wt %), BYK 333 (0.2 wt %), AroCy 10 L US (68.2 wt %) as bisphenol-E based cyanate ester and additional 1500 ppm Al(acac)$_3$ were mixed and filtered over 1 μm.

| Example 2 Compound | Wt % in formulation | Mol of functionality (for 1 kg final formulation) | % of all UV-curing functionalities | % of all curing functionalities |
|---|---|---|---|---|
| IBOA | 12.5 | 0.60 | 32% | 8.5% |
| ACMO | 7.5 | 0.53 | 28% | 7.5% |
| TMPTA | 7.5 | 0.75 | 40% | 10.8% |
| AroCy 10 L | 68.2 | 5.16 | | 73.2% |

The ink was inkjet UV printed and post-cured from RT to 220° C. with a heating ramp of 1 K/min.

The final properties of the final object were:

Tensile strength: 80 MPa

Elongation at break: 2.7%

E-Modulus: 2900 MPa

HDT B: 196° C.

Green body measurement after UV-curing (40×7×4 mm) B

Green body measurement after thermal-curing (40×7×4 mm): B

The viscosity stability of Example 2 is measured to be as following:

| Formulation | Time [days] at 60° C. | Viscosity at 60° C. [mPa · s] |
|---|---|---|
| Example 2 | 0 | 9 |
| | 7 | 15 |

The said inkjet composition comprises:

I) mol/kg acryloyl groups of (M) and (N): 1.89

II) mol % of acryloyl groups provided by reactive compound (N): 40.2

III) molar ratio of contained acryloyl groups (M) and (N) to contained cyanate ester groups of compound (D): 0.37

Example 3

For AroCy 10 L US as the thermally reacting component the viscosity was measured after storage at 60° C. at different time intervals in the presence of different catalysts and concentrations (see table below).

| | Formulation | | | |
|---|---|---|---|---|
| | 1 | 2 | 3 | 4 |
| | Catalyst | | | |
| | Al(acac)$_3$ | | Co(acac)$_3$ | |
| Time of | ppm | | | |
| storage at 60° C. [days] | 700 | 1500 | 700 | 1500 |
| | Viscosity [mPa · s] at 60° C. after storage at 60° C. | | | |
| 0 | 12.3 | 13.8 | 14.0 | 13.9 |
| 2 | 15.7 | 17.9 | 14.6 | 17.8 |
| 5 | 20.8 | 25.4 | 20.1 | 67.4 |
| 7 | 24.7 | 32.4 | 32.0 | 429 |
| Viscosity Increase in % | 201 | 235 | 229 | 3086 |

The viscosity increase in the presence of the cobalt-catalyst is more pronounced than for the aluminum catalyst.

Example 4

Isobornlyacrylate (20.8 wt %), acryloyl morpholine (10.3 wt %), trimethylolpropane triacrylate (10.3 wt %), CN 981 (6.32 wt %), Omnirad 819 (1.0 wt %), Genorad 16 (0.25 wt %), BYK 333 (0.2 wt %) AroCy 10 L US (51.0 wt %) and Aluminium acetylacetonate (0.03 wt %) were mixed and filtered over 1 μm.

| Example 4 Compound | Wt % in formulation | Mol of functionality (for 1 kg final formulation) | % of all UV-curing functionalities | % of all curing functionalities |
|---|---|---|---|---|
| IBOA | 20.8 | 1.00 | 35% | 15% |
| ACMO | 10.3 | 0.73 | 26% | 11% |
| TMPTA | 10.3 | 1.04 | 37% | 16% |
| CN 981 | 6.32 | 0.07 | 3% | 1% |
| AroCy 10 L | 51.0 | 3.86 | | 58% |

The ink was inkjet UV printed and post-cured as follows: 30-130° C. at 1 K/min, 130° C./10h, 130-150° C. at 1 K/min, 150° C./2h, 150-180° C. at 1 K/min, 180° C./2h, 180-200° C. at 1 K/min, 200° C./2h, 200-220° C. at 1 K/min, 220° C./10 min, 220-° C. at −5 K/min.

The final properties of the final object were:

Tensile strength: 86 MPa,

Elongation at break: 3.9%,

E-Modulus: 3500 MPa.

HDT B: 141° C.

Green body measurement after UV-curing (40×7×4 mm) A

Green body measurement after thermal-curing (40×7×4 mm): A

The said inkjet composition comprises:

I) mol/kg acryloyl groups of (M) and (N): 2.85

II) mol % of acryloyl groups provided by reactive compound (N): 39.3

III) molar ratio of contained acryloyl groups (M) and (N) to contained cyanate ester groups of compound (D): 0.74

Example 5

Isobornlyacrylate (17.1 wt %), acryloyl morpholine (7.8 wt %), trimethylolpropane triacrylate (7.3 wt %), CN 981 (6.3 wt %), Omnirad 819 (0.5 wt %), Genorad 16 (0.25 wt %), BYK 333 (0.2 wt %) AroCy 10 L US (60.0 wt %) and Aluminium acetylacetonate (0.03 wt %) were mixed and filtered over 1 μm.

| Example 5 Compound | Wt % in formulation | Mol of functionality (for 1 kg final formulation) | % of all UV-curing functionalities | % of all curing functionalities |
|---|---|---|---|---|
| IBOA | 17.1 | 0.82 | 38% | 12% |
| ACMO | 7.8 | 0.55 | 25% | 8% |
| TMPTA | 7.3 | 0.74 | 34% | 11% |
| CN 981 | 6.3 | 0.07 | 3% | 1% |
| AroCy 10 L | 60.0 | 4.54 | | 67% |

The ink was inkjet UV printed and post-cured as follows: 30-130° C. at 1 K/min, 130° C./10h, 130-150° C. at 1 K/min, 150° C./2h, 150-180° C. at 1 K/min, 180° C./2h, 180-200° C. at 1 K/min, 200° C./2h, 200-220° C. at 1 K/min, 220° C./10 min, 220-° C. at −5 K/min.

The final properties of the final object were:
Tensile strength: 86 MPa,
Elongation at break: 4.2%,
E-Modulus: 3400 MPa.
HDT B: 194° C.
Green body measurement after UV-curing (40×7×4 mm) A
Green body measurement after thermal-curing (40×7×4 mm): A The said inkjet composition comprises:
I) mol/kg acryloyl groups of (M) and (N): 2.19
II) mol % of acryloyl groups provided by reactive compound (N): 37.2
III) molar ratio of contained acryloyl groups (M) and (N) to contained cyanate ester groups of compound (D): 0.48

Example 6

Isobornlyacrylate (20.7 wt %), trimethylolpropane triacrylate (6.7 wt %), CN 981 (4.4 wt %), Omnirad 819 (2.3 wt %), Genorad 16 (0.29 wt %), BYK 333 (0.2 wt %) AroCy 10 L US (65.4 wt %) and Aluminium acetylacetonate (0.033 wt %) were mixed and filtered over 1 μm.

| Example 6 Compound | Wt % in formulation | Mol of functionality (for 1 kg final formulation) | % of all UV-curing functionalities | % of all curing functionalities |
|---|---|---|---|---|
| IBOA | 20.7 | 1.00 | 58% | 15% |
| TMPTA | 6.7 | 0.68 | 39% | 10% |
| CN 981 | 4.4 | 0.05 | 3% | 1% |
| AroCy 10 L | 65.4 | 4.94 | | 74% |

The ink was inkjet UV printed and post-cured as follows: 30-130° C. at 1 K/min, 130° C./10h, 130-150° C. at 1 K/min, 150° C./2h, 150-180° C. at 1 K/min, 180° C./2h, 180-200° C. at 1 K/min, 200° C./2h, 200-220° C. at 1 K/min, 220° C./10 min, 220-° C. at −5 K/min.

The final properties of the final object were:
Tensile strength: 86 MPa
Elongation at break: 3.5%
E-Modulus: 3400 MPa
HDT B: 189° C.
HDT A: 124° C.
Flexural Strength: 111 MPa
Flexural Modulus: 2800 MPa
Izod unnotched: 264 J/m
The said inkjet composition comprises:
I) mol/kg acryloyl groups of (M) and (N): 1.72
II) mol % of acryloyl groups provided by reactive compound (N): 42.5
III) molar ratio of contained acryloyl groups (M) and (N) to contained cyanate ester groups of compound (D): 0.35

Example 7-11

To screen ink and material properties of potential inkjet formulations molded specimens are cured for 30 s from each side in translucent silicon molds from the bottom at a distance of 15 cm by UV-light (LED 395 nm, 16 W/cm 2). Then a thermal post-curing is carried out. Testing results of this photopolymerized and oven-cured bulk specimens are then emphasizing in a good proximity the final material performance of material jetted and post-cured formulations, even though the preparation process in the first curing-step of the interpenetrating system differs.

Example 7-11 illustrate a varying formulation ratio in a way that the degree of functional acrylate groups by (N) are within the limits of claimed dual-curing inkjet inks or beyond the bounds to highlight the correlation of printing application and material characteristics.

Isobornylacrylate, acryloyl morpholine, trimethylpropane triacrylate, Omnirad 819, Genorad 16, AroCy 10 L US and Al(acac)₃ were mixed in ratios as shown in Table 1.

The ink was molded as described above and post-cured as follows: 30-130° C. at 1 K/min, 130° C./10h, 130-150° C. at 1 K/min, 150° C./2h, 150-180° C. at 1 K/min, 180° C./2h, 180-200° C. at 1 K/min, 200° C./2h, 200-220° C. at 1 K/min, 220° C./10 min, 220-30° C. at −5 K/min.

As shown in Table 1 the ink and material properties vary with increasing network density due to the increase of mol % by (N). Thus, the green body strength with labelling C is too low and the material in green state too soft, whereas a warpage of category D is too high and the material has too much internal tension to print and post-cure complex three dimensional objects in a sufficient dimensional accuracy with regard to the digital file. Additionally, good final mechanical properties in terms of toughness and flexibility, of preferably 70-100 MPa tensile strength and preferably 3-5% elongation at break are only achieved by balancing out the degree of functional acrylate groups by (N).

TABLE 1

| Compound (in wt % in formulation) | Example 7 | Example 8 |
|---|---|---|
| IBOA | 18.8 | 16.8 |
| ACMO | 7.2 | 7.2 |
| TMPTA | 3.5 | 5.5 |
| AroCy L 10 US | 70.0 | 70.0 |
| Omnirad819 | 0.3 | 0.3 |
| Genorad16 | 0.25 | 0.25 |
| Al(acac)₃ | 0.035 | 0.035 |
| I) mol/kg acryloyl groups | 1.76 | 1.87 |
| II) mol % of acryloyl groups by (N) | 20.1 | 29.8 |
| III) molar ratio | 0.33 | 0.35 |
| Results | | |
| Viscosity at 50° C. [mPa · s] | 12 | 13 |
| Viscosity at 50° C. [mPa · s] after 8 d at 60° C. | 24 | 27 |

TABLE 1-continued

| | | |
|---|---|---|
| Shore-Hardness after UV-cure | A11 | A28 |
| Shore-Hardness after thermal-cure | D81 | D84 |
| Green body strength after UV-cure (40 mm × 7 mm × 2 mm) | B | A |
| Green body strength after thermal-cure (40 mm × 7 mm × 2 mm) | C | B |
| Warpage after thermal-cure | B | C |
| Tensile strength [MPa] | 44 | 73 |
| Elongation at beak [%] | 1.7 | 3.3 |
| E-Modulus [MPa] | 3100 | 2900 |
| HDT B [° C.] | 215 | 213 |
| $T_g$ [° C.] | 146, 245 | 162, 243 |
| Network density [mol/m$^3$] | 1900 | 1900 |

| Compound (in wt % in formulation) | Example 9 | Example 10 | Example 11 |
|---|---|---|---|
| IBOA | 14.4 | 11.7 | 8.6 |
| ACMO | 7.2 | 7.2 | 7.2 |
| TMPTA | 7.9 | 10.6 | 13.7 |
| AroCy L 10 US | 70.0 | 70.0 | 70.0 |
| Omnirad819 | 0.3 | 0.3 | 0.3 |
| Genorad16 | 0.25 | 0.25 | 0.25 |
| Al(acac)$_3$ | 0.035 | 0.035 | 0.035 |
| I) mol/kg acryloyl groups | 2.00 | 2.14 | 2.31 |
| II) mol % of acryloyl groups by (N) | 40.0 | 50.1 | 60.1 |
| III) molar ratio | 0.38 | 0.40 | 0.44 |
| Results | | | |
| Viscosity at 50° C. [mPa · s] | 14 | 14 | 16 |
| Viscosity at 50° C. [mPa · s] after 8 d at 60° C. | 29 | 33 | 37 |
| Shore-Hardness after UV-cure | A53 | A69 | A78 |
| Shore-Hardness after thermal-cure | D85 | D86 | D86 |
| Green body strength after UV-cure (40 mm × 7 mm × 2 mm) | A | A | A |
| Green body strength after thermal-cure (40 mm × 7 mm × 2 mm) | A | A | A |
| Warpage after thermal-cure | C | C | D |
| Tensile strength [MPa] | 78 | 81 | 65 |
| Elongation at beak [%] | 3.6 | 3.4 | 2.7 |
| E-Modulus [MPa] | 3000 | 3100 | 2800 |
| HDT B [° C.] | 208 | 221 | 219 |
| Tg [° C.] | 182, 242 | 246 | 243 |
| Network density [mol/m$^3$] | 2000 | 2500 | 3600 |

The invention claimed is:

1. An inkjet composition comprising:
   i) photo polymerization reactive compound (M) containing exactly one acryloyl group,
   ii) photo polymerization reactive compound (N) containing at least two acryloyl groups,
   iii) radical photoinitiator (R),
   iv) cyanate ester compound (D) containing at least two cyanate groups, and
   v) cyanate ester curing catalyst (C), wherein
   (M) is different from (D) with the proviso that cyanate ester compound containing exactly one acryloyl group and additionally containing at least two cyanate groups is subsumed to (D),
   (N) is different from (D) with the proviso that cyanate ester compound containing at least two acryloyl groups and additionally containing at least two cyanate groups is subsumed to (D),
   25-50 mol % of the contained acryloyl groups are provided by the reactive compound (N) and the molar ratio of contained acryloyl groups to contained cyanate groups of compound (D) is 0.30 to 0.95, and
   the inkjet composition has 1.0-5.0 mol/kg acryloyl groups.

2. The inkjet composition according to claim 1 having 1.7-3.5 mol/kg acryloyl groups.

3. The inkjet composition according to claim 1 30-45 mol % of the contained acryloyl groups are provided by the reactive compound (N).

4. The inkjet composition according to claim 1, wherein 80-100 mol % of the reactive compound (N) are species containing not more than three acryloyl groups.

5. The inkjet composition according to claim 1, wherein the molar ratio of contained acryloyl groups to contained cyanate groups of compound (D) is 0.36 to 0.94.

6. The inkjet composition according to claim 1, wherein at least 30 wt.-% of the species of (D) are 4,4'-ethylidene-diphenyl dicyanate.

7. The inkjet composition according to claim 1, wherein the radical photoinitiator (R) comprises a phosphinoxide-based photoinitiator.

8. The inkjet composition according to claim 1, wherein the cyanate ester curing catalyst (C) comprises an aluminum metal catalyst.

9. The inkjet composition according to claim 1, wherein 90-100 wt. % of the contained ingredients are species of (M), (N), (R), (D) and (C).

10. The inkjet composition according to claim 1, having a viscosity of 10-40 mPa s at 45° C., where the viscosity is measured on a thermally controlled rotational rheometer in cone-plate geometry, cone diameter: 60 mm, zero-gap distance: 0,061 mm, cone angle: 0,5°, shear-rate 600s-1, at temperatures from 40 to 60° C. with a heating ramp of 2 K/min following the DIN EN ISO 3219.

11. The inkjet composition according to claim 1, which does not contain cationic or anionic (photo) polymerization initiator.

12. The inkjet composition according to claim 1, which contains less than 6 wt. % radical polymerizable monomers not containing acryloyl groups.

13. The inkjet composition according to claim 1, additionally containing one or more of a stabilizer, a wetting agent, a defoamer, a radical polymerization inhibitor, and a pigment.

14. A process for printing a three-dimensional object comprising the steps of:
   (a) jetting an inkjet composition by means of a printing machine to form a layer in a configured pattern corresponding to the shape of the object, the inkjet composition comprising:
      i) photo polymerization reactive compound (M) containing exactly one acryloyl group,
      ii) photo polymerization reactive compound (N) containing at least two acryloyl groups,
      iii) radical photoinitiator (R),
      iv) cyanate ester compound (D) containing at least two cyanate groups, and
      v) cyanate ester curing catalyst (C), wherein
      (M) is different from (D) with the proviso that cyanate ester compound containing exactly one acryloyl group and additionally containing at least two cyanate groups is subsumed to (D),
      (N) is different from (D) with the proviso that cyanate ester compound containing at least two acryloyl groups and additionally containing at least two cyanate groups is subsumed to (D), 25-50 mol % of the contained acryloyl groups are provided by the reactive compound (N) and the molar ratio of contained acryloyl groups to contained cyanate groups of compound (D) is 0.30 to 0.95, and the inkjet composition has 1.0-5.0 mol/kg acryloyl groups (b) irradiating the formed layer to form a photo-cured layer, (c) sequentially repeating steps (a) and (b) to form a plurality of photo-cured layers in order to prepare a green body of the three-dimensional object, and (d) heating the green body to post cure the three-dimensional object.

15. The process according to claim 14, further comprising printing and curing a support ink to stabilize the green body, and removing the cured support ink after step c) and before the performance of step (d) by treating with an aqueous washing liquid, wherein the cured support ink is water soluble.

16. The process according to one claim 14, wherein the heating step (d) is performed in such a way that temperatures between 11° and 140° C. are kept at least for 5 hours.

17. The process according to claim 16, wherein in the heating step (d) the relevant increase of the temperature is limited to 2 K/min.

18. The process according to claim 14, wherein in step (b) the irradiation is performed by means of an UV lamp and the exposure time of each ink layer is 0.1-2 s.

19. A three-dimensional object manufactured according to the process according to claim 14.

20. A three-dimensional object manufactured from an inkjet composition comprising:
   i) photo polymerization reactive compound (M) containing exactly one acryloyl group,
   ii) photo polymerization reactive compound (N) containing at least two acryloyl groups,
   iii) radical photoinitiator (R),
   iv) cyanate ester compound (D) containing at least two cyanate groups, and
   v) cyanate ester curing catalyst (C), wherein
   (M) is different from (D) with the proviso that cyanate ester compound containing exactly one acryloyl group and additionally containing at least two cyanate groups is subsumed to (D),
   (N) is different from (D) with the proviso that cyanate ester compound containing at least two acryloyl groups and additionally containing at least two cyanate groups is subsumed to (D),
   25-50 mol % of the contained acryloyl groups are provided by the reactive compound (N) and the molar ratio of contained acryloyl groups to contained cyanate groups of compound (D) is 0.30 to 0.9, and
   the inkjet composition has 1.0-5.0 mol/kg acryloyl groups.

21. The inkjet composition according to claim 1, wherein 90-100 mol % of the reactive compound (N) are species containing not more than three acryloyl groups.

22. The inkjet composition according to claim 1, wherein least 60 wt.-% of the species of (D) are 4,4'-ethylidenediphenyl dicyanate.

23. The inkjet composition according to claim 1, wherein the radical photoinitiator (R) comprises diphenyl (2,4,6-trimethylbenzoyl) phosphine oxide and/or phenylbis (2,4,6-trimethylbenzoyl) phosphine oxide.

24. The inkjet composition according to claim 1, wherein the cyanate ester curing catalyst (C) comprises aluminum acetylacetonate.

25. The inkjet composition according to claim 1, wherein 97-100 wt. % of the contained ingredients are species of (M), (N), (R), (D) and (C).

26. The inkjet composition according to claim 1, which contains less than 2 wt. % radical polymerizable monomers not containing acryloyl groups.

* * * * *